US005664080A

United States Patent [19]

Lucas et al.

[11] Patent Number: 5,664,080

[45] Date of Patent: Sep. 2, 1997

[54] SYSTEM AND METHOD FOR GENERATING A UNIVERSAL PALETTE AND MAPPING AN ORIGINAL COLOR SPACE TO THE UNIVERSAL PALETTE

[75] Inventors: Bruce David Lucas, Yorktown Heights, N.Y.; Arturo Aureliano Rodriguez, Belmont, Calif.; Mark Andrew Pietras, Boynton Beach, Fla.; Andres Jesus Saenz, Belmont, Calif.

[73] Assignee: International Business Machines Corporation, Armonk, N.Y.

[21] Appl. No.: 963,973

[22] Filed: Oct. 20, 1992

[51] Int. Cl.[6] .................................................. H04N 9/00

[52] U.S. Cl. ........................ 345/431; 345/155; 345/199

[58] Field of Search .............................. 395/131, 158; 345/186, 199, 155; 358/335; 348/409

[56] References Cited

U.S. PATENT DOCUMENTS

| | | | |
|---|---|---|---|
| 4,692,757 | 9/1987 | Tsuhara et al. | 345/116 |
| 4,818,979 | 4/1989 | Manson | 345/115 |
| 4,862,154 | 8/1989 | Gonzalez-Lopez | 345/201 |
| 4,954,819 | 9/1990 | Watkins | 345/119 |
| 4,956,638 | 9/1990 | Larky et al. | 345/199 |
| 5,001,469 | 3/1991 | Pappas et al. | 395/158 X |
| 5,025,249 | 6/1991 | Seiler et al. | 395/131 X |
| 5,038,300 | 8/1991 | Seiler et al. | 395/131 |
| 5,065,144 | 11/1991 | Edelson et al. | 345/186 |
| 5,208,679 | 5/1993 | Yamauchi et al. | 358/335 X |
| 5,353,061 | 10/1994 | Rodriguez et al. | 348/409 |
| 5,424,755 | 6/1995 | Lucas et al. | 345/155 |

FOREIGN PATENT DOCUMENTS 1-183685 7/1989 Japan .

OTHER PUBLICATIONS

"Multiple Pseudo Color Lookup Tables in Raster Graphic and Image Displays", IBM Technical Disclosure Bulletin, vol. 26, No. 7A, New York, U.S., Dec., 1983, pp. 3409–3418, Judd et al.

"Mapping Multiple Images To One Custom Color Palette", IBM Technical Disclosure Bulletin, vol. 30, No. 12, New York, U.S., May, 1988, pp. 5–6.

"Video Subsystem Supporting Multiple Image Planes, Priority and Windowing", IBM Technical Disclosure Bulletin, vol. 32, No. 4A, New York, U.S., Sep., 1989, pp. 211–213.

"Default RGB Color Palette with Simple Conversion from YUV", IBM Technical Disclosure Bulletin, vol. 33, No. 5, New York, U.S., Oct., 1990, pp. 200–205.

"Color Pallette Expansion Technique for a Windowed Environment", IBM Technical Disclosure Bulletin, vol. 34, No. 7B, New York, U.S., Dec., 1991, pp. 40–42.

Ulichney, "Challenges in Device–Independent Image Rendering", Topical Meeting on Applied Vision, 1989 Technical Digest Series, vol. 16, (Optical Society of America, Washington, D.C. 1989) pp. 144–147.

*Primary Examiner*—Mark K. Zimmerman
*Attorney, Agent, or Firm*—Bernard D. Bogdon; Andrew J. Dillon

[57] ABSTRACT

A system and method for generating a universal palette and for mapping the color space for an original image into the universal palette for compression. The universal palette utilizes a one byte three color format type allowing reservation of shades for a presentation layer of an operating system for the digital computer. The three color components for a pixel in an original image are then mapped to a specific palette having the one byte format. Mapping depends in part, upon the original component values. Where a color component does not correspond closely to a color component in the universal palette, it will have a value falling between first and second color values in the universal palette. The component is mapped to either the first or second color value on a pseudo-probablistic basis.

11 Claims, 6 Drawing Sheets

| | | | |
|---|---|---|---|
| 0 → 31 | RESERVED | | |
| 32 | 0 | 0 | 0 |
| 33 | 0 | 0 | 85 |
| 34 | 0 | 0 | 170 |
| 35 | 0 | 0 | 255 |
| 36 | 0 | 36 | 0 |
| 37 | 0 | 36 | 85 |
| 38 | 0 | 36 | 170 |
| 39 | 0 | 36 | 255 |
| 40 | 0 | 72 | 0 |
| 41 | 0 | 72 | 85 |
| 42 | 0 | 72 | 170 |
| 43 | 0 | 72 | 255 |
| ⋮ | ⋮ | ⋮ | ⋮ |
| 64 | 0 | 255 | 255 |
| 65 | 42 | 0 | 0 |
| 66 | 42 | 0 | 85 |
| 67 | 42 | 0 | 170 |
| 68 | 42 | 0 | 255 |
| 69 | 42 | 36 | 0 |
| ⋮ | ⋮ | ⋮ | ⋮ |
| 252 | 255 | 255 | 0 |
| 253 | 255 | 255 | 85 |
| 254 | 255 | 255 | 170 |
| 255 | 255 | 255 | 255 |

*Fig. 3*

| | | | |
|---|---|---|---|
| 0 | 8 | 2 | 10 |
| 12 | 4 | 14 | 6 |
| 3 | 11 | 1 | 9 |
| 15 | 7 | 13 | 5 |

132

| | | | |
|---|---|---|---|
| R = K<br>G = L<br>B = 100 | 100 | 100 | 100 |
| 100 | 100 | 100 | 100 |
| 100 | 100 | 100 | 100 |
| 100 | 100 | 100 | 100 |

134

| | | | |
|---|---|---|---|
| K', L'<br>85 | 85 | 85 | 85 |
| 85 | 85 | 170 | 85 |
| 85 | 85 | 85 | 85 |
| 170 | 85 | 170 | 85 |

*Fig. 7*

SYSTEM AND METHOD FOR GENERATING A UNIVERSAL PALETTE AND MAPPING AN ORIGINAL COLOR SPACE TO THE UNIVERSAL PALETTE

BACKGROUND OF THE INVENTION

1. Technical Field

The invention relates to a multimedia display system for digital computers and more particularly to playback of a plurality of simultaneous images and video segments on the display system for the digital computer. The invention relates still more particularly to a system and a method of generating a universal color lookup table and mapping a color space into the universal color lookup table.

2. Description Of the Related Art:

Digital color images can be stored in a computer in an absolute, or direct, color representation, or in a palettized, or indirect, color representation. In an absolute color representation, three numerals are stored, one each for the red component, the green component, and the blue component. To display an image stored in this representation, each value is fed into a digital-to-analog converter that drives the appropriate output gun in a video monitor. If eight-bit values are used to represent each color value, up to 16 million potential colors can be represented with this method.

A palettized image is generated by selecting a small number of colors, usually less than or equal to 256 from the potentially large number of colors in the image. These colors are stored as values in a table. Each pixel is then represented as an index into this table. The color values in the tables can be fed into the digital-to-analog converters that drive the output guns. Palettization is sometimes called color image quantization.

The use of palettized images requires less storage space than an absolute color image. Because of its reduced size, it can often be moved more quickly around a display screen than an absolute color image. For this reason, it is often desirable to use palettized images.

However, many problems result from palettizing images, especially when several images or video clips are to be simultaneously displayed. When dissolving between different palettized images, overlaying one palettized image on another, or placing pieces of several palettized images on the display screen at the same time, distorting color changes can occur in images if the values in the look-up table are changed.

There are several known techniques for solving this problem. One technique is to use a standard palette for all images. Then only a very small fixed subset of colors is used to represent all color images. The use of a standard or universal palette reduces the quality of the images, since no fixed palette of 256 colors can adequately represent all color images.

Computer graphics systems capable of providing dynamic displays, including video segments, are well known. To provide smoothly moving objects in these displays a video signal must refresh image frames at a minimum of 15 to 30 frames-per-second. Such a frame rate simulates the appearance of motion to a human observer.

Adaptive methods have been applied using smaller custom palettes built to represent each image to be simultaneously placed on the display screen. For example, if two images are to be displayed simultaneously, each image can be mapped to 128 colors. The palette of one image can occupy the first 128 entries in the look-up table, and the palette of the other image can occupy the last 128 entries in the look-up table. As the number of images being displayed simultaneously grows, the size of the palette generated for each image shrinks. As the size of the palette gets smaller, the quality of the image also declines.

Another technique exploits the fact that in many images there is an overlap of color usage, particularly in images that will be used together on the same display. Therefore, a custom color map can be generated from the distribution of colors in all the images to be displayed simultaneously.

By examining the color usage in all the images, an optimized palette of 256 colors can be selected. Each pixel in each of the images can be mapped to one color in this palette. The method makes the combination of images on a display screen quite simple. When the images are to be displayed, only one palette needs to be loaded into memory. No adjustment of indices needs to be made when additional images or pieces of images are added to the display. All pixel values are indices into the same palette.

As more and more images are mapped to the same palette, the quality of each image will degrade. However, since the method takes advantage of color redundancy in images, the degradation will be much slower than if individual palettes of fewer and fewer colors were selected for each image. The major problem in application of the technique comes when it is applied to video.

The adaptive quantization method operates to select suitable sets of colors for sets of images. When video segments are reproduced, images are being constantly replaced, requiring potentially frequent update of the palette. The obvious disadvantage to adaptive techniques is the computational load imposed on computers if required to analyze all of the data represented by a video clip to settle upon a best set of colors for all images. Few contemporary personal computers can process such a quantity of data in a reasonable time period.

Further, if an adaptive quantization process is performed for each frame, the palette for the frame would have to be stored with the frame. Such a palette would typically include 256 entries of 3 bytes each or 768 bytes of data to be appended to each frame in storage. As a result, in a personal computer, additional central processor clock cycles would be consumed in recovery and loading of the palette, bandwidth of the storage device would be taxed and more storage space consumed.

If an adaptive quantization algorithm is performed over an entire video clip in a personal computer, the amount of memory consumed and the required computation time becomes unacceptable. Moreover, during playback, an adaptive quantization algorithm might provide poor visual quality since such algorithms tend to select a specified number of representative colors by clustering in three dimensional color space. This implies that if part of a video clip is significantly different than the rest of the clip, its original colors may be poorly represented or ignored. However, the most important reason not to use adaptive quantization algorithms in multimedia environments and applications, where multiple images and video windows can be concurrently running, is that in general, the multiple images and video clips contain different color ranges. A palette optimized for the color information in one image or video clip cannot be used for another image or video clip; the 8 bit pixel values of the latter image or video clip, which are indices to their own palette, would not be accessing the correct representative color values in a different optimized palette. In multimedia applications, or any applications, allowing users to simultaneously display multiple images and playback multiple video clips mandate that a universal palette be employed.

When using a universal color palette, color differences between regions which were small in an original image can become exaggerated. The problem to be overcome in using a universal palette is to minimize the unsightly contouring effects between such image regions resulting from color distortion. The problem is complicated for certain personal computer systems in which a portion of the available color palette has been reserved for the operating system. Color lookup table sharing between an operating system presentation layer and an application at distortion of the output of the application is desirable.

SUMMARY OF THE INVENTION

The invention provides a method and system for generating a universal palette for a multimedia display and for mapping color spaces of executing applications to the universal palette. The universal palette utilizes a one byte, red, green and blue format (e.g. RGBB) and allows reservation of shades for a presentation layer of an operating system. The red, green and blue components for a pixel in an original image are then mapped to a specific palette having the one byte format. Mapping depends in part, upon the original component values. Where a color component does not correspond closely to a color component in the universal palette, it will have a value falling between first and second color values in the universal palette. The component is mapped to either the first or second color value on a probablistic basis. That is, if the component falls 70% percent of the way from the first color value to the second color value, it has about an apparent 70% probability of being mapped to the second color value and about an apparent 30% probability of being mapped to the first color value.

Implementation of the probablistic mapping operation is done by dividing the original image into a plurality of nonoverlapping blocks. Mapping of a pixel further depends upon the pixel's position within a block. Each pixel location within a nonoverlapping block is assigned a dither value. Generation of an index for the pixel into the universal palette is based upon the dither value and the original color components for the pixel.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 illustrates a data structure for a universal palette;

FIG. 7 illustrates portions of data structures for image frames.

DETAILED DESCRIPTION OF THE INVENTION

Figure 1:
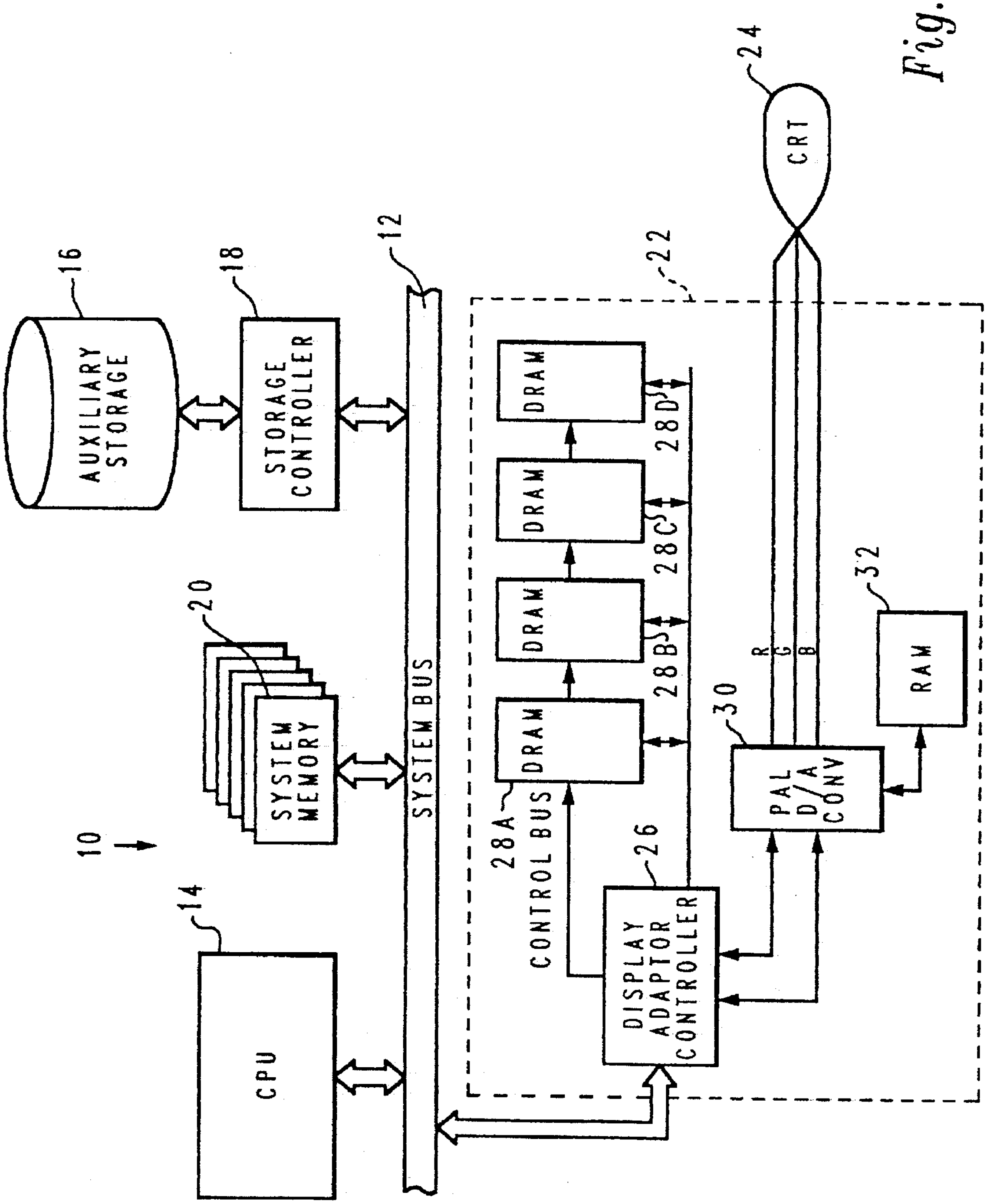
FIG. 1 is a high level block diagram of a data processing system which can be utilized to implement the method of the present invention.

With reference now to the figures and in particular with reference to FIG. 1, there is depicted a block diagram of a personal computer system 10, preferably an IBM PS/2 personal computer. Computer system 10 includes a system bus 12. Connected to system bus 12 is a central processing unit (CPU) 14, CPU 14 passes data to and receives data from other devices attached to system bus 12 over the system bus.

Such data includes pictorial information for images and video segments. Images and video segments are typically stored on an auxiliary storage device 16 such as a compact disc read only memory, connected to system bus 12 through a storage controller 18. Alternatively, a video segment or image may be received by system 10 from a camera through an analog to digital conversion mechanism, or over an interface to a communication system.

Computer system 10 includes a system memory 20 connected to system bus 12 for exchange of data between memory 20 and other devices connected to system bus 12. Computer system 10 further includes a display adapter 22 and a cathode ray tube 24 (CRT) or other display device. Display adapter 22, among other operations, handles conversion of video data to analog signals appropriate for driving CRT 24. A display adapter controller 26 receives frames or updates to frames over system bus 12 and stores or updates a display frame in memory units 28A–28D. Display adapter controller 26 can also receive a palette for use in generating a display. The palette is stored in random access memory 32. Video information is stored in DRAM devices 28A–28D as matrices of indices into the palette stored in random access memory 32. To display an image stored in DRAM 28A–28D, the indices are applied to converter 30 which accesses RAM 32 to produce red, green and blue output values which are converted to analog signal levels on the red, green and blue trigger lines to CRT 24.

Figure 2:
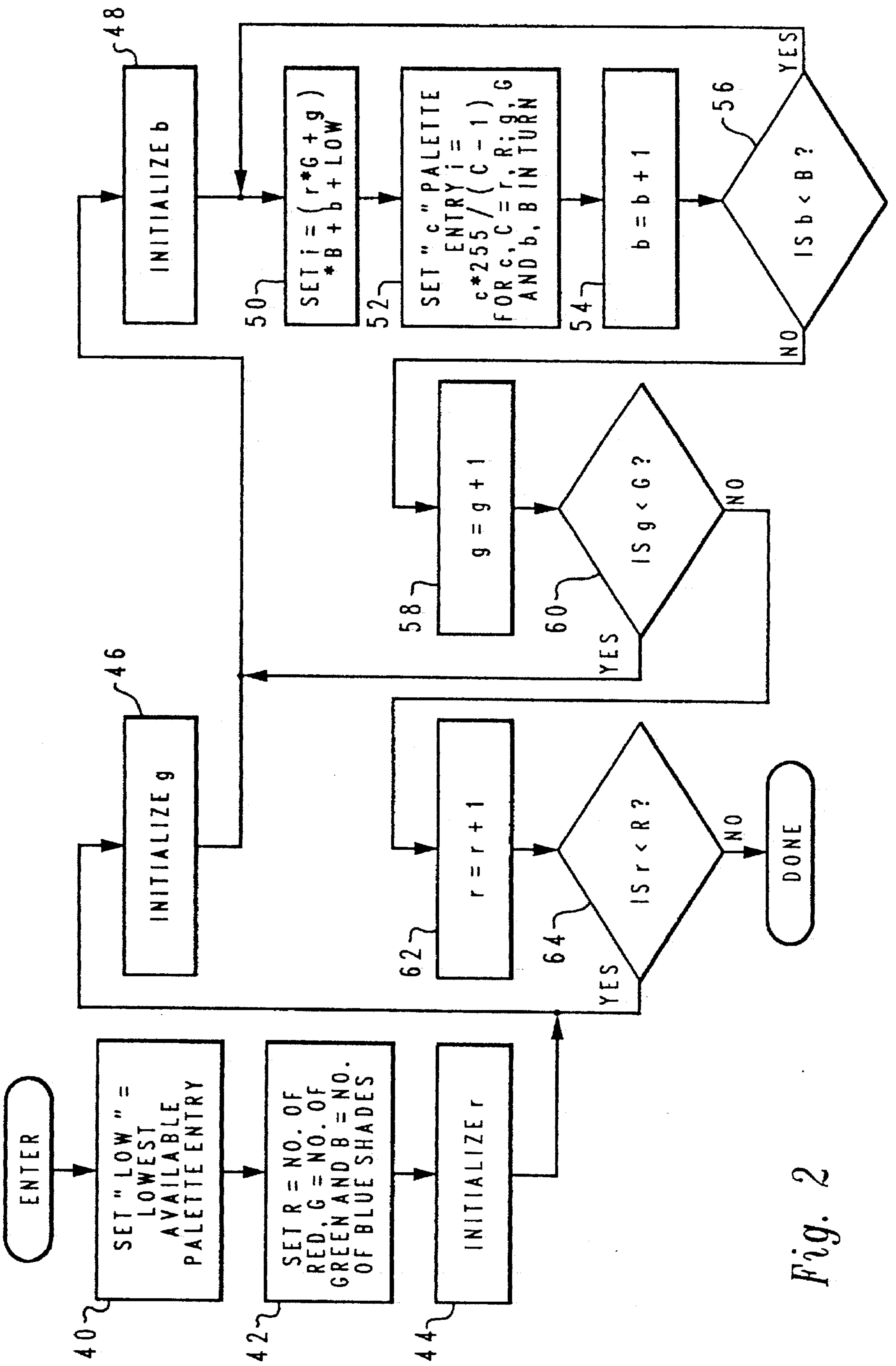
FIG. 2 is a logical flow chart of a process executable on the data processing system of FIG. 1 for generating a universal palette.

FIG. 2 is a logical flowchart of a process executed on the data processing system 10 for generation of a universal palette. Original images are typically captured in RGB24 format. RGB24 format is a 3 color format which uses 1 byte of resolution for each color. Accordingly, 1 byte provides 256 red intensity levels, a second byte supplies 256 green intensity levels and the last byte supports 256 blue intensity levels for each pixel. Three to one compression is obtained by writing the RGB24 format into an RGB8 format. In RGB8 1 byte is available to define all three color intensity levels. A number of formats are available within the RGB8 format, including RGB884 which allows definition of 8 shades of red, 8 shades of green and 4 shades of blue. A useful format is RGB784 which allows definition of 7 shades of red, 8 shades of green and 4 shades of blue. RGB784 utilizes only 224 of 256 available entries in the RGB8 format. The unused entries may be reserved for gray tones for monochrome systems. In the present application, they are reserved for use of a presentation layer in the operating system.

The reservation of palette entry locations for the operating system is represented by step 40 of the process of FIG. 2, where the variable "LOW" is set equal to the lowest valued offset into a 256 entry data structure which is not reserved for use by the operating system. In step 42, a user, or the data processing system, can select a specific RGB format, such as RGB784. For RGB784, the R variable equals 7, the G variable equals 8 and the B variable equals 4. Setting of these variables is used to quantize the original color space into the RGB784 color space. To quantize is to divide the range of a variable into a finite number of nonoverlapping intervals and to designate each interval by an assigned value within an interval. An example of such an operation is the quantization of persons' ages on intervals of one year.

In step 44 a counter r is initialized to 0. Next, in step 46 a counter g is initialized to 0. In step 48 a counter b is initialized to 0. The three counters correspond to the three color components to be quantized.

Step 50 provides generation of an offset or index *i* into the palette data structure. The function for generating this index is $$I=(r\times G+g)\times B+b+LOW.$$

In step 52 the palette entries for each color at the just calculated offset are generated. The flowchart gives a generalized expression for three functions set forth below which are used to generate the palette entries. Those three functions are:

$$\text{red palette entry } I=\frac{r\times 255}{R-1}$$

$$\text{green palette entry } I=\frac{g\times 255}{G-1}$$

and $$\text{blue palette entry } I=\frac{b\times 255}{B-1}.$$

In step 54 the counter b is incremented by 1. At step 56 b is compared to B and if smaller the process is returned to step 50. If b is equal to or larger than B the NO branch from step 56 is followed to step 58 where the counter g is incremented by 1. At step 60 g is compared to G. If g is smaller than G, the YES branch is followed back to step 48 where b is reinitialized. If g is equal to or greater than G the NO branch is followed from step 60 to step 62 where the index R is incremented by 1. Similarly, in step 64 r is compared to R. If r is smaller than R, the YES branch is followed to step 46 where g is reinitialized. If r is larger than or equal to R the NO branch is followed out of the process.

FIG. 3 illustrates a data structure generated by the process of FIG. 2. Offsets 0–31 correspond to reserved entries held for use by the operating system. Beginning with offset 32 corresponding to the variable LOW, intensity levels for red, green and blue of 0 have been entered. With the next cycle the index b and the offset are changed by 1 and the value 85 is written to the blue column. The entries in red and green columns remain at 0. At an offset of 36, the green column receives its first nonzero entry of 36. At an offset of 65, the red column receives its first nonzero entry of 42. The 256 shades of blue are quantized into 4 shades of blue distributed over the range 0 to 255. 256 shades of green are distributed over the range of 0 to 255 in 8 intervals. 256 shades of red are distributed over the range of 0 to 255 in 7 intervals. The palette of FIG. 3 that is stored in display adapter 22 and which provides the output levels used to drive CRT 24.

Figure 4:
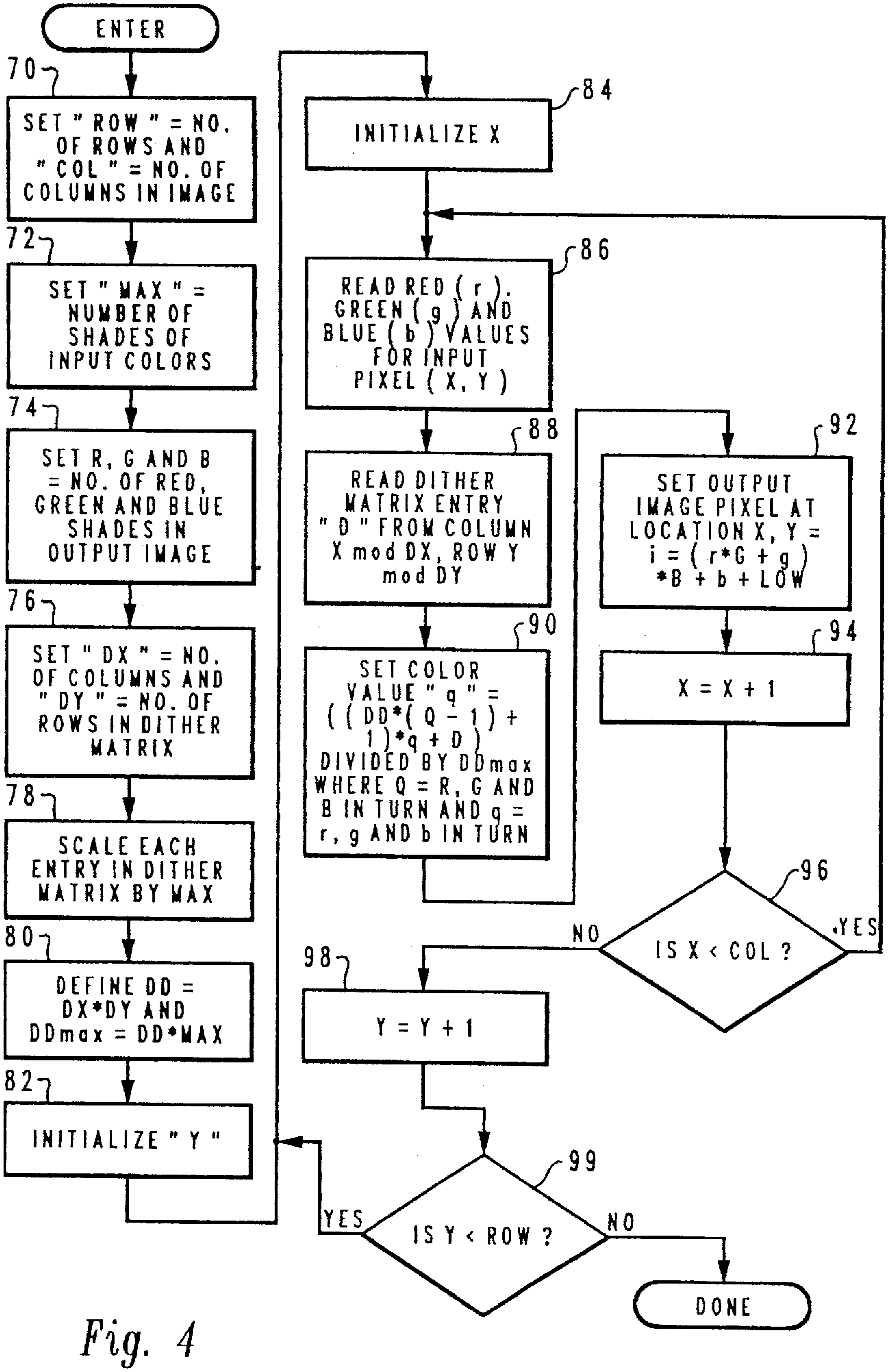
FIG. 4 is a logical flow chart of a process for mapping pixels from an original image into the universal palette of FIG. 3.

FIG. 4 is a logical flowchart of a process for compressing an original image using a universal palette such as that of FIG. 3. The first 4 steps of the process relate to definition of variables. In step 70, a variable ROW is set equal to the number of rows in either the original image or the output image. The variable COL is set equal to the number of columns in either image. The number of rows and columns in the original image and in the output image are equal. No averaging of adjacent pixels need be used for compression. In step 72 the variable MAX is set equal to the number of shades of each input colors. For RGB24 MAX will equal 256 for each color. In step 74 the variables R, G and B are set equal to the number of red, green and blue shades in the output image. This is the same as the number of shades for each of these three component colors as is provided in the universal palette of FIG. 3. For RGB784 R will equal 7, G will equal 8 and B will equal 4. Finally, in step 76 a variable DX is set equal to the number of columns and DY is set equal to the number of rows in a dither matrix. In step 78 each entry in a dither matrix is multiplied by MAX. Next, in step 80 the variable DD is defined as equal to the number of columns times the number of rows in the dither matrix and the variable DDMAX is set equal to the result of the multiplication of DD times the variable MAX.

Compression of an original image now begins. With execution of steps 82 and 84 the variables Y and X are initialized to equal 0. Because the pixels or picture elements of an image are arranged in a matrix, X and Y are used as counters to access each picture element in a sequential manner. Next, with execution of step 86 the red ($r_O$), green ($g_O$) and blue ($b_O$) color component values for input pixel X,Y are read. Next, in step 88 the dither matrix entry D from column X modulus DX and row Y modulus DY is read. The modulus operations of step 88 have the affect of dividing the matrix of the input original image into a plurality of nonoverlapping submatrices corresponding in size to the dither matrix.

In step 90, the values for the colors R, G and B are modified as set forth in the general equation of the flowchart. Specifically a new red value component value $$r=[((DD\times(R-1)+1)\times r_0+D)]/DDMAX.$$

Similarly $$g=((DD\times(G-1)+1)\times g_0+D)/DDMAX, \text{ and}$$

$$b=((DD\times(B-1)+1)\times b_0+D)/DDMAX.$$

Inclusion of the dither value D recovered from the dither matrix means that the color component value in the compression image is determined from a particular color component value in the original image and location in the dither matrix. Instead, a color component value may assume one of two quantized values on either side of the original color.

In step 92, the index is set to the quantity (r×G+g)×B+b+LOW and the image pixel value for location (X,Y) is stored. In step 94 the value of X is incremented by 1 and in step 96 the value of X is tested against the variable COL. If pixels remain in a row for conversion operation is returned along the YES branch to step 86. If not, operation is advanced to step 98 to increment the Y by 1. In step 99, Y is tested against the variable ROW. If all rows have been compression for a frame, the NO branch is followed to exit the process. If Y is less than row operation is returned to step 84 to reinitialize X.

Figures 5, 6:
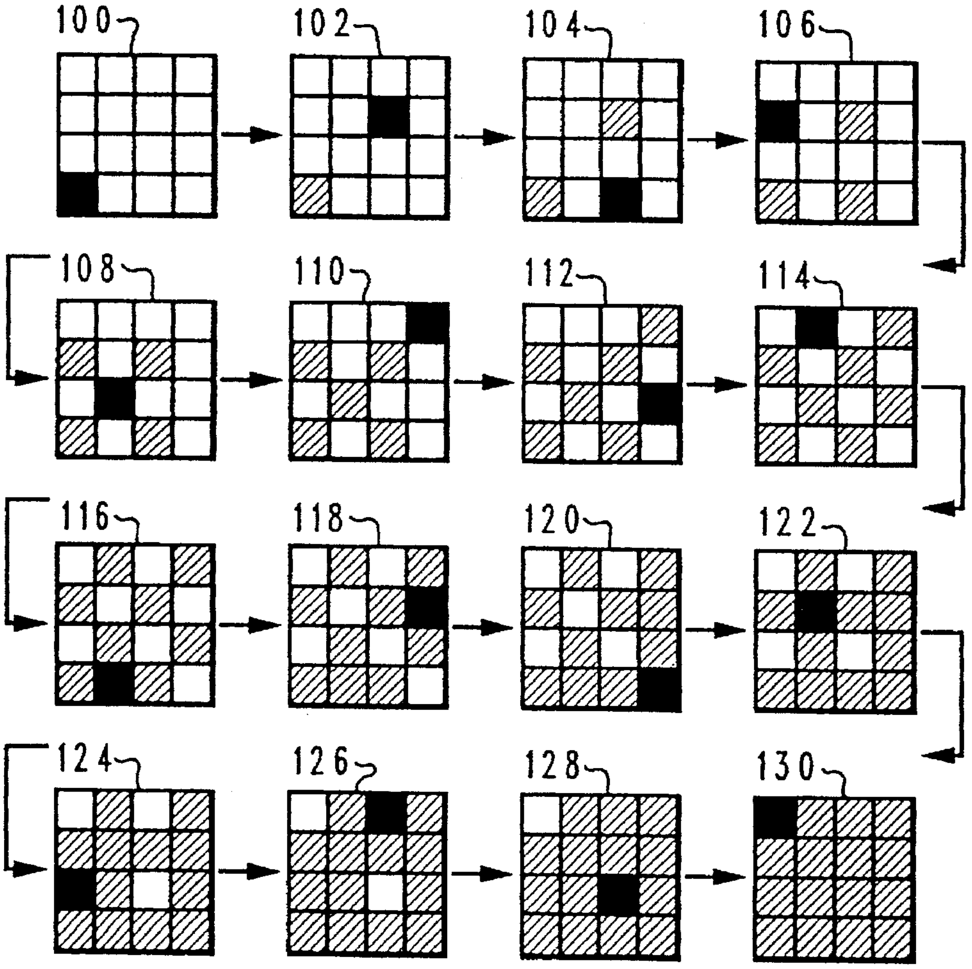
FIG. 5 illustrates a dither matrix used by the process of FIG. 4.
FIG. 6 is a schematic illustration of the operation of the process of FIG. 4.

FIG. 5 illustrates a dither matrix used by the process of FIG. 4 for the RGB 784 format. The dither matrix is a 4 by 4 matrix, and includes an integer in the range of 0 to 15 disposed at each location of the matrix. The effect of the dither matrix is to the an output image with replicated copies of the dither matrix. The tiling operation can be better understood if we consider its affect on a uniform field in the original image. Consider a uniform field having a blue intensity value 85 and red and green levels as 0. Because 85 is a value found in the RGB784 format all pixels in the field will map to the value 85 in the output field. Now consider increasing the blue intensity value incrementally from 85 to 170, the next value for blue available in the universal palette. As the intensity value of blue increases more and more pixels in the output field will be painted using the 170 value. Initially just one pixel will receive the 170 value as illustrated in box 100 of FIG. 6. As blue intensity increases, two pixels will receive the 170 value while the remaining 14 pixels remain at 85 as illustrated in box 102. Box 103 illustrates 3 pixels receiving a 170 value while 13 remain at 85. The progression of pixels changing to 170 is illustrated as occurring in the pattern that continues from boxes 106–130, where all pixels have been rewritten to 170. The human eye averages the values displayed on an output screen and sees a hue or intensity of blue close to the original color. The pattern used substantially reduces contour effects stemming from compression.

FIG. 7 illustrates a box 132 and a box 134 corresponding to an original image. A uniform field of blue having intensity value of 100 has been captured in the block of 136. The output image consists of 13 pixels receiving an output value of 85 and 2 pixels receiving an output value of 170 for an average output value of for an average field value over the 16 pixels of approximately 101.

The process has a pseudo-probablistic behavior for each color component. The process in effect partitions the dynamic range of the color components into a number of equal intervals according to the number of shades for that color component. The indices will perfectly represent certain color values. Hence, when an original color component value is equal to a representative color value, the probability that the dither will provide the index for the representative color value closest to the original color value is 1. A uniform color region that has an original color value exactly at the midpoint between two representative color values has an apparent probability equal to 0.5 of obtaining the index of one representative color value and an apparent probability equal 0.5 of obtaining the index of the other color value. For a uniform color region, the closer that the original color value is to our representative color value, the higher the probability that the other dither will not select the index of the adjacent representative color value.

It should be noted that a number which is not a power of 2 is used for the number of shades for each color. As a consequence it is possible to reserve palette entries for purposes other than the universal palette.

The mechanism generates a universal palette and a mapping from the original color space to the palette that is suitable for compressing natural color images and for playback of compressed color video clips while allowing a number of palette entries to be reserved for the operating system. The mechanism offers the advantages of permitting simultaneous display and playback of multiple images and video clips in multimedia applications, reducing storage requirements for stored image and video data and providing independence of the original color distribution for images in video. In video decompression and playback, ordered dither enhances the appearance of displayed information because it is compatible with frame-differencing algorithms for further video compression. The mechanism is adaptable to a number of different RGB color spaces and does not require a computation intensive clustering algorithm to find representative sets of colors or images.

While the invention has been particularly shown and described with reference to a preferred embodiment, it will be understood by those skilled in the art that various changes in form and detail may be made therein without departing from the spirit and scope of the invention.

What is claimed is:

1. A method of compressing an original image captured using a three color component space, the method comprising the steps executed by a digital computer of:

reserving a portion of a universal palette space for a presentation layer of a computer operating system;

quantizing the three component color space into a universal palette having three color components over an unreserved portion of the universal palette space;

dividing the original image into a plurality of nonoverlapping blocks each comprising an m×n array of pixels;

providing a dither matrix having entries corresponding to the m×n array;

for each pixel, reading the entry in the dither matrix corresponding to the location of the pixel; and calculating an index for the pixel into the universal palette based upon the color component values for the pixel and the entry read from the dither matrix.

2. A method of compressing an original image captured using a three color component space according to claim 1, and further comprising:

responsive to reservation of a portion of the universal palette space, determining a three color component format for the universal palette.

3. A method of compressing an original image captured using a three color component space as set forth in claim 1, wherein the quantizing step comprises quantizing the three component color space into a color space having a number of shades where the number of shades is not a power of two.

4. A method of compressing an original image captured using a three color component space as set forth in claim 3, wherein the step of calculating determines the index into the universal palette value as follows:

$$r=[((DD\times(R-1)+1)\times r_0+D)]/DDMAX.$$

$$g=((DD\times(G-1)+1)\times g_0+D)/DDMAX, \text{ and}$$

$$b=((DD\times(B-1)+1)\times b_0+D)/DDMAX,$$

where $r_0$, $g_0$ and $b_0$ are the color component values for a pixel; R, G and B are the number of shades of each of the three colors available in the output image; DD is the size of the dither matrix; DDMAX is DD times the number of shades of each color in the input image; and D is a dither matrix value.

5. A method of compressing an original image as captured using a three color component space as set forth in claim 4, wherein the step of calculating further comprises:

setting the index to the quantity $$(r\times G+g)\times B+b+LOW$$

where LOW is an offset into the universal palette table.

6. Apparatus for compressing video segments and images for a multimedia display system, comprising:

means for storing data;

means for storing an original image captured in a three color component space stored within said means for storing data;

means responsive to a request of an operating system for reserving a portion of an unreserved palette for a presentation layer of a computer operating system;

means for quantizing the three color component space into a universal palette having three components and storing the universal palette to the data storing means;

means for dividing the original image into a plurality of nonoverlapping blocks each comprising an m×n array of pixels;

a dither matrix data structure stored in the data storing means having entries corresponding to the m×n array;

means for reading the entry in the dither matrix corresponding to a location of a pixel; and means for calculating an index for the pixel into the universal palette based upon the color value component values for the pixel and the entry read from the dither matrix.

7. Apparatus for compressing video segments and images for a multimedia display system as set forth in claim 6; and further comprising:

means responsive to reservation of a portion of the universal palette space for determining a three color format for the universal palette.

8. Apparatus for compressing video segments and images for a multimedia display system as set forth in claim 7, and further comprising:

means for executing a plurality of concurrent applications; and means for displaying an output from each concurrent application using the universal palette.

9. Apparatus for compressing an original image captured using a three color component space as set forth in claim 6, wherein the means for quantizing the three color component space into a universal palette having three components comprises means for quantizing the three color component space into a color space having a number of shades where the number of shades is not a power of two.

10. Apparatus for compressing an original image captured using a three color component space as set forth in claim 9, wherein the means for calculating determines the index into the universal palette as follows: determines the index into the universal palette value as follows:

$$r=[((DD\times(R-1)+1)\times r_0+D)]/DDMAX.$$

$$g=((DD\times(G-1)+1)\times g_0+D)/DDMAX,\text{ and}$$

$$b=((DD\times(B-1)+1)\times b_0+D)/DDMAX,$$

where $r_0$, $g_0$ and $b_0$ are the color component values for a pixel; R, G and B are the number of shades of each of the three colors available in the output image; DD is the size of the dither matrix; DDMAX is DD times the number of shades of each color in the input image; and D is a dither matrix value.

11. A method of compressing an original image as captured using a three color component space as set forth in claim 10, wherein the means for calculating sets the index to the quantity $$(r\times G+g)\times B+b+LOW$$

where LOW is an offset into the universal palette table.

* * * * *